No. 736,457.

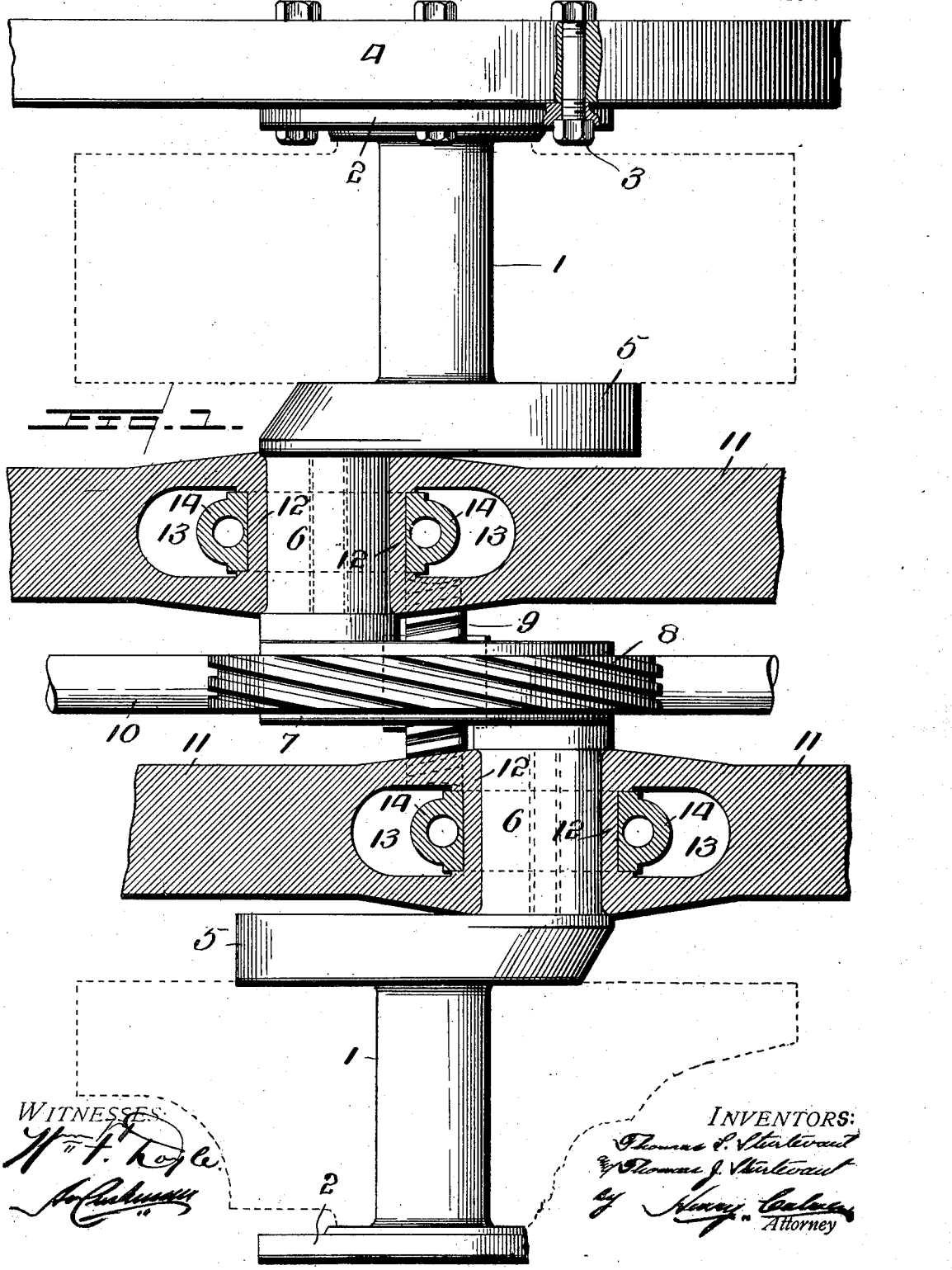

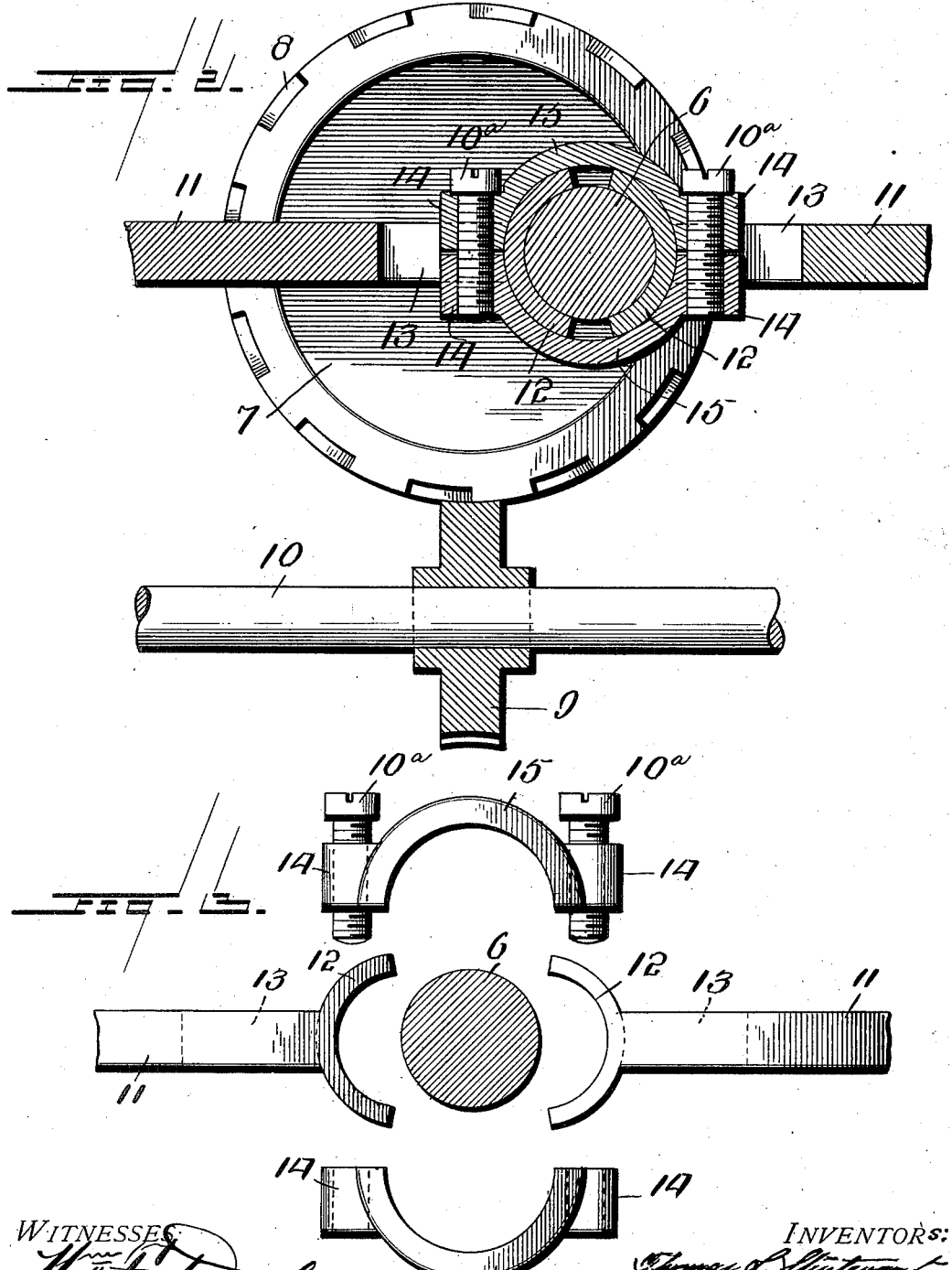

Patented August 18, 1903.

UNITED STATES PATENT OFFICE.

THOMAS LEGGETT STURTEVANT, OF QUINCY, AND THOMAS JOSEPH STURTEVANT, OF WELLESLEY, MASSACHUSETTS.

CRANK AND CRANK CONNECTION.

SPECIFICATION forming part of Letters Patent No. 736,457, dated August 18, 1903.

Application filed February 25, 1903. Serial No. 144,942. (No model.)

*To all whom it may concern:*

Be it known that we, THOMAS LEGGETT STURTEVANT, residing at Quincy, and THOMAS JOSEPH STURTEVANT, residing at Wellesley, in the county of Norfolk, State of Massachusetts, citizens of the United States, have invented certain new and useful Improvements in Cranks and Crank Connections, of which the following is a specification, reference being had therein to the accompanying drawings.

The present invention relates to crankshafts and crank connections, and has for its object to provide a crank and crank connection which is strong, compact, and simple, the parts being few in number, readily assembled and adjusted, and so securely held that danger of any of the parts becoming loosened and dropping out of place is eliminated.

The crank and crank connection which will be hereinafter described in detail in connection with the drawings accompanying and forming a part of this specification is intended especially for use in connection with engines for automobile construction and will be so described, and a construction particularly designed and adapted for engines of the double-cylinder type will be illustrated, but it will be understood that the showing and description are merely illustrative of the invention and not limitative, for the construction may, it is obvious, be adapted for and used with any machine in which a crank mechanism is capable of use.

In the drawings, Figure 1 is a plan view of a crank-shaft of the double-crank-pin type, illustrating the present invention, the crank and its connections being in section. Fig. 2 is a sectional view taken through one of the crank-pins and connections to show the construction, the geared crank-web which forms a feature of the invention being also shown in mesh with its driven pinion, which latter is carried by a suitable cross-shaft. Fig. 3 is a view of the crank-pin connections and their securing means separated from one another and from the crank-pin for clearness.

Referring to the drawings by numerals, like numbers indicating like parts in the several views, 1 denotes the trunnions of the double crank, said trunnions being supported in suitable bearings on the engine frame or casing (not shown) in the usual manner. Said trunnions 1 are provided with integral end plates or flanges 2, to which may be secured by suitable bolts 3 a fly-wheel, as 4, or a clutch device, such construction of crankshaft with end flanges 2 to which the fly-wheel 4 is bolted being preferable to the ordinary method of keying the parts together, for the reason that the parts may be assembled or disconnected in much less time and with less labor.

At the inner ends of the trunnions 1 and integral therewith are the crank balance-weights 5, from which project the integral crank-pins 6, said weights and pins being of ordinary construction. The cranks, as shown, are oppositely placed or diametrically opposed, although any other angular relation may be given them as the work which is to be done may demand.

The said crank-pins 6 at their inner ends are connected, preferably by being made integral therewith, to a centrally-disposed solid web 7. Said web 7 is circular, as shown, and its periphery is cut with spiral gear-teeth 8, which mesh with and drive a pinion 9, mounted on a cross-shaft 10, which is supported in suitable bearings (not shown) on the engine-frame. Said solid web 7 having the gear cut in its periphery is a valuable feature of the present invention, for the reason that by forming such web solid and integral with the cranks great strength, close assemblage, and compactness of parts is secured, while the gear-teeth 8 being cut in the web proper the disadvantages and likelihood of derangement incidental to the separate gear detachably secured to the crank are done away with. The said cross-shaft 10, it will be understood, may perform any desired work in connection with the operation of the engine—such as, for example, the actuation of sparking devices, valves, &c.

To each of the crank-pins 6 are secured the pitmen connections 11, and while double pitmen are shown it will be apparent that the pitmen connections which will now be described may be used to connect a single pitman with its crank-pin, if desired. As the double pitmen shown are identical in construction, the description of one will suffice. Each pitman 11 has its crank-head forked or formed as a circular segment 12, which embraces and fits closely the crank-pin 6, on either side thereof, the forks or arms of the segments 12 of the opposite pitmen 11 not surrounding the crank-pin 6 completely, so as to leave a clearance between the segmental forks and provide for adjustment of the parts to compensate for wear. The pitmen 11 are provided with apertures 13 through their bodies in rear of the segments 12, which embrace the crank-pins 6, said openings receiving the screw-threaded lugs 14 at the rear ends of the segmental straps or binders 15, which are placed about the segments 12 at the ends of the pitmen 11 and serve to hold them in position, screws 10$^a$ being provided, by means of which the said segmental binders 15 may be secured at both ends and adjustment of the parts affected.

While we have shown the gear-teeth on the integral web as cut in the periphery thereof, it will be understood that a gear-toothed ring might be shrunk onto the periphery of the web, and in event of the breaking of any of the cut teeth on the web the said web may then be turned down and such a gear-toothed ring shrunk thereon, so that the crank may still be serviceable, and the necessity of providing an entire new crank because of the breaking of the web gear-teeth will thus be obviated.

It is obvious that other numerous slight changes in the construction shown and described, well within the skill of the mechanician, may be made without departing from the spirit of the invention, and it is not to be understood, therefore, as being limited to anything shown and described except in so far as it is limited by the terms of the appended claims.

Having thus described our invention, we claim and desire to secure by Letters Patent—

1. A crank-shaft having a crank-pin connected therewith, and a circular web carried by said crank-pin and provided with peripheral gear-teeth, combined with a pinion meshing with said gear-teeth.

2. A crank-shaft having a crank-pin integral therewith, and a solid circular web formed integral with said crank-pin and provided with peripheral gear-teeth, combined with a pinion meshing with said gear-teeth.

3. A double-crank shaft having crank-pins carried thereby, and a solid circular web connecting said crank-pins and integral therewith, said circular web being provided with peripheral gear-teeth, combined with a pinion meshing with said gear-teeth.

4. A double-crank shaft having crank-pins integral therewith and oppositely placed relative to each other, and an intermediate solid circular web uniting said crank-pins and integral therewith, said circular web having gear-teeth cut in its periphery, combined with a pinion meshing with said gear-teeth.

5. In combination, a crank-shaft having a crank-pin, a circular web carried by said crank-pin and having gear-teeth cut in its periphery, a cross-shaft, and a pinion on said cross-shaft meshing with said geared web and driven thereby.

6. In combination, a double-crank shaft having crank-pins, an integral circular web uniting said crank-pins and having gear-teeth cut in its periphery, a cross-shaft, and a pinion on said cross-shaft meshing with said geared web and driven thereby.

7. In combination, a double-crank shaft having supporting-trunnions and end flanges formed integral therewith to support a fly-wheel or other part, integral crank-pins carried by said shaft, a solid circular web intermediate said crank-pins and integral therewith, said web having a peripheral gear, a cross-shaft, a pinion thereon meshing with and driven by said web-gear, and two pitmen suitably attached to said crank-pins.

In testimony whereof we affix our signatures in presence of two witnesses.

THOMAS LEGGETT STURTEVANT.
THOMAS JOSEPH STURTEVANT.

Witnesses:
RUBERT M. GAY,
L. K. STURTEVANT.